United States Patent Office 3,751,469
Patented Aug. 7, 1973

3,751,469
METHOD OF PREPARING FLUORO-PERHALOAZAOLEFINS
Bryce C. Oxenrider, Florham Park, and Cyril Woolf, Morristown, N.J., and Wilhelmus M. Beyleveld, Deventer, Netherlands, assignors to Allied Chemical Corporation, New York, N.Y.
No Drawing. Filed July 9, 1971, Ser. No. 161,336
Int. Cl. C07c 119/00
U.S. Cl. 260—566 R                    9 Claims

ABSTRACT OF THE DISCLOSURE

Fluoroperhaloazaolefins are prepared by reacting a fluoroperhaloalkyl isocyanate with a fluoroperhaloalkoxide. For example, perfluoro-2,4-dimethyl-3-aza-2-pentene is prepared by reacting hexafluoroisopropyl isocyanate with potassium heptafluoroisopropoxide. The fluoroperhaloazaolefins are useful as liquid dielectrics and as intermediates in the preparation of other fluorinated organic compounds.

---

In accordance with this invention, fluoroperhaloazaolefins having the formula

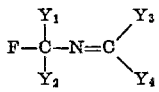

wherein $Y_1$, $Y_2$, $Y_3$ and $Y_4$ are independently fluorine or fluoroperhaloalkyl radicals having either the formula $CF_2X(CFX)_m$— wherein X is fluorine or chlorine and $m$ is 0 to 6, or the formula

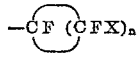

wherein X is chlorine or fluorine and $n$ is 3 to 5, are prepared by reacting, under substantially anhydrous conditions at a temperature ranging from about 40° C. to about 200° C., a fluoroperhaloalkyl isocyanate having the formula

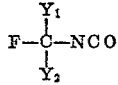

wherein $Y_1$ and $Y_2$ are as defined above, with a fluoroperhaloalkoxide having the formula

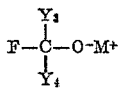

wherein $Y_3$ and $Y_4$ are as defined above and M represents the cation portion of the fluoroperhaloalkoxide.

The formation of the fluoroperhaloazaolefin is represented by the following equation

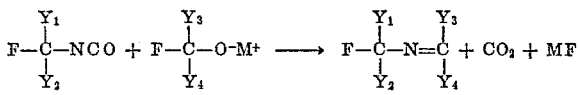

wherein $Y_1$, $Y_2$ $Y_3$, $Y_4$ and M are as defined herein.

The fluoroperhaloazaolefin is recovered from the reaction mixture in accordance with conventional methods, such as by fractional distillation.

The fluoroperhaloalkyl isocyanate reactants are a known class of compounds being described, for example, in U.S. Pats. 2,617,817 and 3,118,923 and our copending application Ser. No. 14,652, filed February 26, 1970, now Pat. No. 3,705,917.

The fluoroperhaloalkoxide reactants, which are also known compounds, are prepared by reacting the corresponding fluoroperhalogenated carbonyl compound with an ionizable fluoride salt, as represented by the following equation

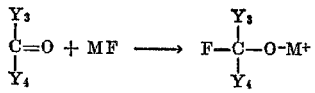

wherein $Y_3$, $Y_4$ and M are as defined herein. Ionizable fluoride salts which form alcoholate salts with the carbonyl compound include potassium fluoride, rubidium fluoride, cesium fluoride, silver fluoride and tetra(lower alkyl) ammonium fluoride. Potassium fluoride is preferred.

If desired, the reaction mixture can be diluted with an inert, aprotic, polar, liquid diluent, such as acetonitrile, dimethylformamide, dimethylsulfoxide, dimethylacetamide, glycol ethers, cyclic polymethylene sulfones, and the like. Acetonitrile is preferred.

The reaction is preferably carried out at a temperature ranging from about 50° C. to about 150° C. The pressure employed is not critical and can be above or below atmospheric pressure as desired. However, the reaction is conveniently carried out at pressures autogenously developed at the reaction temperatures employed.

In the preferred embodiments of this invention, $Y_1$, $Y_2$, $Y_3$ and $Y_4$ are independently fluorine or fluoroperhaloalkyl radicals having the formula $CF_2X(CFX)_m$— wherein X is fluorine or chlorine, preferably fluorine, and $m$ is 0 to 6, preferably 0 to 3. Especially good results are obtained when $Y_1$, $Y_2$, $Y_3$ and $Y_4$ are trifluoromethyl.

The fluoroperhaloazaolefins of this invention are useful as dielectric liquids for insulating electrical apparatus. They are employed in accordance with conventional methods for employing dielectric liquids.

The following examples further illustrate the invention. In each example, the reaction was carried out under substantially anhydrous conditions.

EXAMPLE 1

A sealed reactor containing 4.48 grams (0.02 mol) of potassium heptafluoroisopropoxide
4.2 grams (0.02 mol) of heptafluoroisopropyl isocyanate
30 ml. of acetonitrile (diluent)

was maintained at 75° C. for 21.5 hours. After the reaction mixture had been allowed to cool to room temperature, the volatile components were removed from the reaction mixture under a vacuum and collected. Infrared spectrum analysis indicated that the volatile components were perfluoro-2,4-dimethyl-3-aza - 2 - pentene, carbon dioxide, and some unreacted heptafluoroisopropyl isocyanate.

EXAMPLE 2

A sealed reactor containing 21 grams of potassium 1-chloro-1,1,2,3,3,3-hexafluoroisopropoxide in 40 ml. of acetonitrile and 18.5 grams of heptafluoroisopropyl isocyanate was maintained at 75° C. for about 16 hours. After the reaction mixture had cooled to room temperature, it was vented and the remaining liquid was fractionally distilled. Two reaction products were recovered: 2-chlorodifluoromethyl-4-trifluoromethyl-3-azaheptafluoro-2 - pentene and perfluoro-2,4-dimethyl-3-aza-2-pentene. The presence of the perfluorinated azaolefin indicated that some transisocyanation had occurred.

Perfluoro-2,4-dimethyl-3-aza-2-pentene has the following dielectric properties:

Dielectric constant, 1 kc. (ASTM D–150) _____ 1.83
Dielectric strength, kv./mil (ASTM D–877) ____ 27.8
Dissipation factor, 1 kc. (ASTM D–150) _____ 0.0005

We claim:
1. A process for preparing a fluoroperhaloazaolefin having the formula

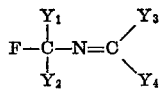

wherein $Y_1$, $Y_2$, $Y_3$ and $Y_4$ are independently fluorine or fluoroperhaloalkyl radicals having either the formula $$CF_2X(CFX)_m-$$

wherein X is fluorine or chlorine and $m$ is 0 to 6, or the formula $-CF(CFX)_n$ wherein X is chlorine or fluorine and $n$ is 3 to 5, which process comprises reacting under substantially anhydrous conditions at a temperature ranging from about 40° C. to about 200° C., a fluoroperhaloalkyl isocyanate having the formula

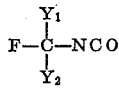

wherein $Y_1$ and $Y_2$ are as defined above, with a fluoroperhaloalkoxide having the formula

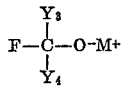

wherein $Y_3$ and $Y_4$ are as defined above and M represents the cation portion of the alkoxide selected from the group consisting of potassium, rubidium, cesium and silver.

2. The process of claim 2 wherein $Y_1$, $Y_2$, $Y_3$ and $Y_4$ are independently fluorine or fluoroperhaloalkyl radicals having the formula $CF_2(CFX)_m-$ wherein X is fluorine or chlorine and $m$ is 0 to 6.

3. The process of claim 2 wherein $m$ is 0 to 3.

4. The process of claim 3 wherein X is fluorine.

5. The process of claim 4 wherein $Y_1$, $Y_2$, $Y_3$ and $Y_4$ are trifluoromethyl.

6. The process of claim 1 wherein the temperature ranges from about 50° C. to about 150° C.

7. The process of claim 3 wherein the temperature ranges from about 50° C. to about 150° C.

8. The process of claim 7 wherein the reaction mixture contains an inert, aprotic, polar, liquid diluent.

9. The process of claim 8 wherein $Y_1$, $Y_2$, $Y_3$ and $Y_4$ are trifluoromethyl.

References Cited
UNITED STATES PATENTS 2,643,267   6/1953   Pearlson et al. _____ 260—566 D
2,912,429   11/1959   Tullock _____ 260—566 D X LEON ZITVER, Primary Examiner G. A. SCHWARTZ, Assistant Examiner U.S. Cl. X.R.
260—566 F; 252—66

UNITED STATES PATENT OFFICE
CERTIFICATE OF CORRECTION

Patent No. 3,751,469     Dated August 7, 1973

Inventor(s) B. C. Oxenrider, C. Woolf and W. Beyleveld

It is certified that error appears in the above-identified patent and that said Letters Patent are hereby corrected as shown below:

Column 4, line 6, "$CF_2(CFX)_m$" should read --$CF_2X(CFX)_m$

Signed and sealed this 1st day of January 1974.

(SEAL)
Attest:

EDWARD M. FLETCHER, JR.
Attesting Officer

RENE D. TEGTMEYER
Acting Commissioner of Patents